US006973556B2

(12) United States Patent
Milligan et al.

(10) Patent No.: US 6,973,556 B2
(45) Date of Patent: *Dec. 6, 2005

(54) DATA ELEMENT INCLUDING METADATA THAT INCLUDES DATA MANAGEMENT INFORMATION FOR MANAGING THE DATA ELEMENT

(75) Inventors: Charles A. Milligan, Golden, CO (US); Stephen S. Selkirk, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 742 days.

This patent is subject to a terminal disclaimer.

(21) Appl. No.: 09/751,641

(22) Filed: Dec. 29, 2000

(65) Prior Publication Data

US 2002/0087672 A1    Jul. 4, 2002

Related U.S. Application Data

(60) Provisional application No. 60/212,284, filed on Jun. 19, 2000.

(51) Int. Cl.[7] ............................................. G06F 12/00
(52) U.S. Cl. ..................... 711/202; 711/114; 707/100
(58) Field of Search .................... 709/325; 707/100; 711/202, 114

(56) References Cited

U.S. PATENT DOCUMENTS

| | | | | |
|---|---|---|---|---|
| 5,960,451 A | * | 9/1999 | Voigt et al. .................. | 711/114 |
| 6,026,474 A | * | 2/2000 | Carter et al. ................. | 711/202 |
| 6,282,602 B1 | * | 8/2001 | Blumenau et al. ............. | 711/4 |
| 6,546,458 B2 | * | 4/2003 | Milligan et al. ............ | 711/114 |

* cited by examiner

*Primary Examiner*—Jack Lane
(74) *Attorney, Agent, or Firm*—Yee & Associates, P.C.

(57) ABSTRACT

A mechanism is provided for storing self-defining data and mapping elements with either a fixed set of allowed structures or types or with the structures and types determined by rules. Recovery is enhanced by the use of backward and forward pointers between data and mapping elements for the data elements in the order written by the management algorithm. Recovery is also enhanced by the use of companion pointers with metadata. The companion pointers may include pointers to data or mapping elements that are part of the same structural grouping. The metadata may describe the structural grouping. The metadata may also include pointers to the previous and/or next versions of the same elements. Recovery of the data and/or mapping structures is achieved by the reverse application of the management algorithm.

26 Claims, 4 Drawing Sheets

| | |
|---|---|
| • Identity of this data element | 405 |
| • Identity of the data unit associated with this data element | 410 |
| • Pointer to current physical location | 412 |
| • Pointer to history of physical locations | 414 |
| • Mapping structure type (e.g. tree, log structured file, etc.) | 416 |
| • Pointers to related data element(s) | 418 |
| • Pointer to a list of related data elements | 420 |
| • Pointer to access a related data unit | 422 |
| • Time stamps (of last change, change history) | 424 |
| • Rules for processing the metadata | 426 |
| • Pointers to rules for processing metadata | 428 |
| • Rules for ordering processing of data elements | 430 |
| • Data unit attributes | 432 |
|     - Performance criteria | 434 |
|     - Reliability criteria | 436 |
|     - Availability criteria | 438 |
|     - Capacity criteria | 440 |
| • Pointer to executable functions for interpreting and executing management rules | 442 |
| • Boundary information for this data element | 444 |
| • Boundary information for the data unit(s) associated with this data element | 446 |
| • Access History information for this data element | 448 |
| • Access History information for related data elements or data units | 450 |

DATA ELEMENT INCLUDING METADATA THAT INCLUDES DATA MANAGEMENT INFORMATION FOR MANAGING THE DATA ELEMENT

CROSS REFERENCE TO PROVISIONAL AND RELATED APPLICATIONS

This application claims the benefit of the filing date of corresponding U.S. Provisional Patent Application No. 60/212,284, entitled "System for providing a policy-based demand and use of functions like virtual volumes, instant copy, RAID, etc.", filed Jun. 19, 2000. In addition, the present invention is related to applications entitled A SYSTEM TO SUPPORT DYNAMICALLY FLEXIBLE DATA DEFINITIONS AND STORAGE REQUIREMENTS, Ser. No. 09/751,635; EFFECTING TNSTANT COPIES IN A DYNAMICALLY MAPPED SYSTEM, Ser. No. 09/884,294; USING CURRENT RECOVERY MECHANISMS TO IMLEMENT DYNAMIC MAPPING OPERATIONS, Ser. No. 09/800,714; DYNAMICALLY CHANGEABLE VIRTUAL MAPPING SCHEME, Ser. No. 09/751,772; FLOATTNG VIRTUALTZATION LAYERS, Ser. No. 09/752,071; and RECOVERY OF DYNAMIC MAPS AND DATA MANAGED THEREBY, Ser. No. 09/752,253, which are filed even date hereof, assigned to the same assignee, and incorporated herein by reference.

BACKGROUND OF THE INVENTION

1. Technical Field

The present invention relates to an improved data processing system and, in particular, to recovery of virtualization structures. Still more particularly, the present invention provides a method and apparatus for providing self-defining data units.

2. Description of Related Art

Maps are used in a disk controller to convert a host based Logical Unit (LUN) and Logical Block Address (LBA) to a controller based LUN and LBA. A mapping system is necessary for a disk controller to provide features such as virtual volumes, data compression, and snapshot. In fact, maps are used in current controller designs to facilitate the use of Redundant Array of Independent Disk (RAID) devices.

A problem that arises when using a mapped based architecture is where to store the maps. Current map designs use anywhere from four megabytes for a very simple map to dynamic mapping systems that use twelve megabytes or more. As the sizes of disks increase and the sizes of system configurations increase, it is not inconceivable that these systems will require maps that are several gigabytes in size.

These large structures make recovery of the data, in the case of a lost or failed virtual map, a time-consuming and complicated process. In addition, some simple and straightforward mapping schemes are vulnerable to loss of data even if only a small portion of the map is corrupted or lost. In some cases, the recovery takes so long that the customer may consider the data lost even if it can eventually be recovered.

Thus, it would be advantageous to provide self-defining data and mapping elements.

SUMMARY OF THE INVENTION

The present invention provides a mechanism for storing self-defining data and mapping elements with either a fixed set of allowed structures or types or with the structures and types determined by rules. Recovery is enhanced by the use of backward and forward pointers between data and mapping elements in the order written by the management algorithm. Recovery is also enhanced by the use of companion pointers with metadata. The companion pointers may include pointers to data or mapping elements that are part of the same structural grouping. For example these pointers may point to the elements that make up a redundancy stripe or the elements that make up a mapping sub-tree. The metadata may describe the structural grouping. The metadata may also include pointers to the previous and/or next versions of the same elements. For example, the metadata may include a pointer to the previous older version of a data block or to the location where the next version of the data block will be stored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an example of a metadata data structure in accordance with a preferred embodiment of the present invention.

DETAILED DESCRIPTION OF THE PREFERRED EMBODIMENT

Figure 1:
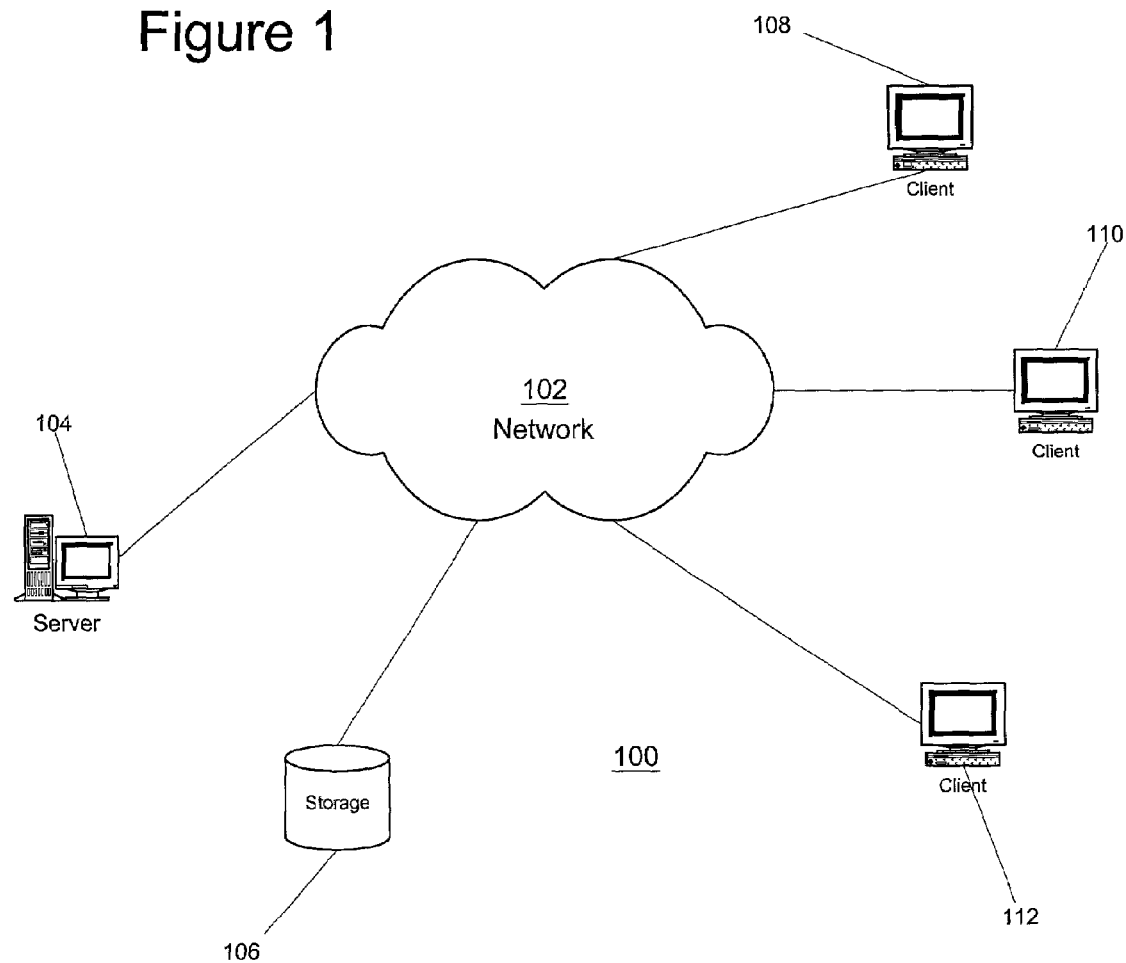
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage subsystem 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 may be implemented as one or more of a number of different types of networks, such as, for example, an intranet, a local area network (LAN), or a wide area network (WAN). Network 102 contains various links, such as, for example, fiber optic links, packet switched communication links, enterprise systems connection (ESCON) fibers, small computer system interface (SCSI) cable, wireless communication links. In these examples, storage subsystem 106 may be connected to server 104 using ESCON fibers. FIG. 1 is intended as an example and not as an architectural limitation for the present invention.

Figure 2:
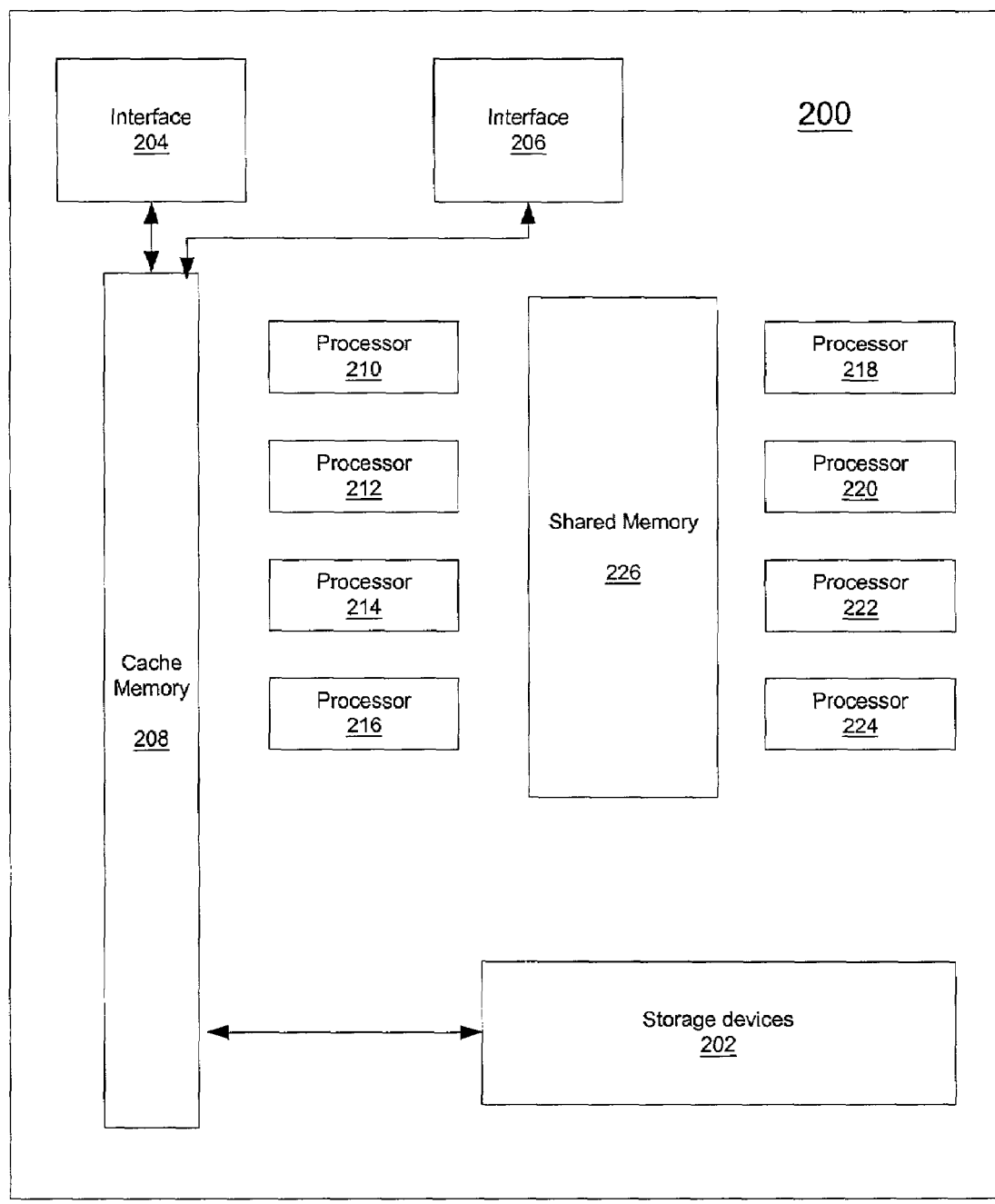
FIG. 2 is a block diagram of a storage subsystem in accordance with a preferred embodiment of the present invention.

Turning next to FIG. 2, a block diagram of a storage subsystem is depicted in accordance with a preferred embodiment of the present invention. Storage subsystem 200 may be used to implement storage subsystem 106 in FIG. 1. As illustrated in FIG. 2, storage subsystem 200 includes storage devices 202, interface 204, interface 206, cache memory 208, processors 210–224, and shared memory 226.

Interfaces 204 and 206 in storage subsystem 200 provide a communication gateway through which communication between a data processing system and storage subsystem 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage subsystem 200 is a shared virtual array. Storage subsystem 200 is a virtual storage system in that each physical storage device in storage subsystem 200 may be represented to a data processing system, such as client 104 in FIG. 1, as a number of virtual devices. In this example, storage devices 202 are a set of disk drives set up as a redundant array of independent disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and track the reading and writing of data to storage devices 202. In particular, processors 210–224 are used to execute instructions for routines used in snapshot copy operations.

The present invention manages virtual storage facilities comprising an organization of computer equipment, for example, a host network, data transfer means, storage controller means and permanent storage means and attachment means connecting these devices together. The data storage facilities also may include management information associated with data units such that the management information provides an inventory of capabilities with upper and lower boundaries that may limit the options available to store the data and still meets a user's criteria. All RAID stripe groups may be read at once up to the point of anticipated performance requirements. If all RAID stripe groups are read at once, but the system does not meet a newly imposed performance requirement then the data may be rewritten to a higher performance capability. Such management information may be independent of attributes of characteristics of the elements of the physical storage subsystem actually used to store the data objects, but may consist of imputed associations with those attributes through, for example, changeable rule sets, processes or algorithms. These rule sets, processes or algorithms may be changed by user demand or via processes that may monitor data object usage and manipulation. The storage of data objects may be adjusted to comply with modifications in the rules sets, processes or algorithms, for example.

Figure 3:
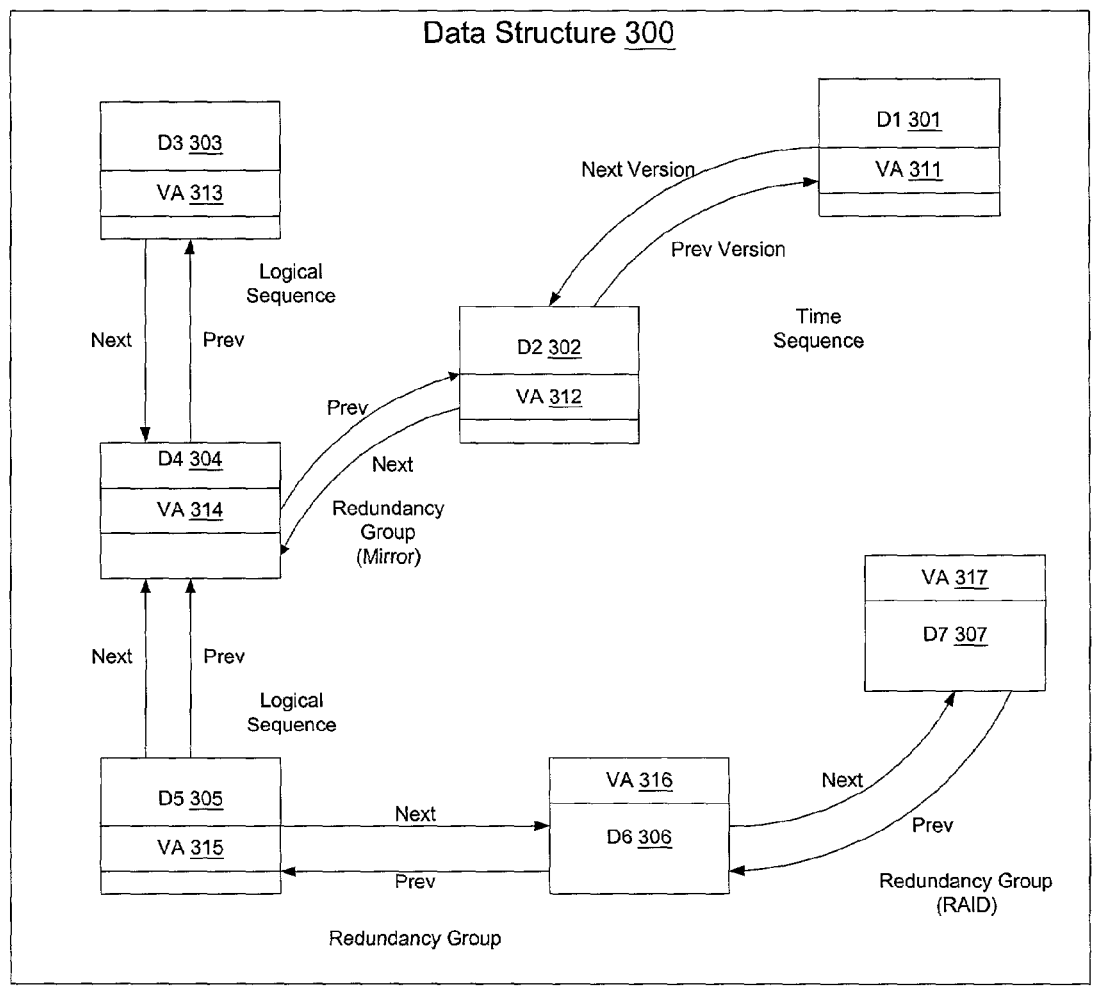
FIG. 3 is a block diagram of a data structure in accordance with a preferred embodiment of the present invention.

With reference to FIG. 3, a block diagram of a data structure is illustrated in accordance with a preferred embodiment of the present invention. Data structure 300 includes data elements D1 301, D2 302, D3 303, D4 304, D5 305, D6 306, and D7 307. Each data element includes metadata uniquely associated with the data such that installation management criteria, boundaries, and preferences for each data unit and attributes for the data units are maintained. This metadata may include time sequencing of metadata (time stamp), location of stored data, structure definition pointers including size parameters, pointers to related metadata units, management rules, sequencing rules, and management functions invoked to accomplish management rules.

The management rules may include performance criteria, reliability criteria, availability criteria, and capacity criteria. The sequencing rules may include logical rules, time rules, and structure rules. Management functions may include RAID, parity, multiple parity, and other known functions that may be invoked to accomplish management rules. Management rules, sequencing rules, and management functions may also be stored in the metadata as pointers to the rules or functions.

Furthermore, each data element may include pointers to the next or previous version in a time sequence. For example, data element D1 301 includes a pointer to the next version of updated data, D2 302. Consequently, data element D2 includes a pointer to the previous version, D1. Each data element may include pointers to the next or previous data element in a logical sequence, such as a next track in a sequence. For example, data element D3 303 may include a pointer to D4 304 as the next track and D4 may include a pointer to D5 as the next track. Conversely, D5 may include a pointer to D4 as the previous data element in the logical sequence and D4 may include a pointer to D3 as the previous data element.

Data elements D2 302 and D4 304 may include metadata to indicate that they are mirrored with pointers to the mirrored copies. Therefore, one can get twice the read performance and improved availability. Data elements D5, D6, and D7 may include metadata to indicate that they are part of a RAID stripe and the available read bandwidth is three drives.

The metadata may be stored separate from the data. Thus, each data element may include a virtual address (VA) pointing to the host view of the stored data. For example, D1 301 includes VA 311, D2 302 includes VA 312, D3 303 includes VA 313, D4 304 includes VA 314, D5 305 includes VA 315, D6 306 includes VA 316, and D7 307 includes VA 317.

The data elements in FIG. 3 may be mapping elements. Mapping elements may include forward and backward pointers to mapping elements. If the mapping tables are lost or corrupted, then the mapping may be recovered by finding one or more of the data elements, rebuilding the mapping by following the all the links to the other data elements, and reestablishing the mapping entries with the virtual address stored in the data element.

FIG. 4 is an example of a metadata data structure in accordance with a preferred embodiment of the present invention. Such a data structure 400 may include all or a subset of, but is not limited to, the items described here.

Metadata item 405 is/contains an identifier to uniquely identify the data element (or elements) described by this metadata structure. Metadata item 410 identifies the data unit or units associated with this data element (or elements). This may be, for example, a virtual data unit address, or a pointer to such an address or an input to an algorithm to calculate an address. This item 410 is used during virtual mapping system recovery to rebuild the map.

Metadata item 412 contains a pointer to the current physical storage location wherein this data element (or elements) is stored. Item 412 may alternatively contain an input to an algorithm used to calculate the physical storage location pointer or address. Item 412 may alternatively contain an indicator that this data element is not stored anywhere, but is un-allocated or assumed to have a zero (or some other default) data content. Item 412 may also point to a list of multiple physical locations where duplicate copies of this data element are stored.

Metadata item 414 contains a history of one or more previous physical storage locations. If the current physical storage location is not accessible, it might be possible to recover the data from a previously used location.

Metadata item 416 contains an indication of the type of virtual mapping structure used to map from the associated data unit or units to this data element or elements. The types may include but are not limited to, an algorithmic mapping, a multi-level mapping tree, and a single level or two level mapping table.

Metadata item 418 contains pointers to related data elements. There may be multiple such pointers. The pointers may be to the physical location of the data itself, or to the associated metadata, or may be an input to an algorithm used to calculate the location of the related data element. A data element may be related to this data element in one or more of a variety of ways, for example; a data element may be another element in a redundancy group, or the next or previous element written on a log structured file or it may be a parent or child data element in a tree structure or the previous or next element in a tree sequence, etc.

Metadata item 420 contains a pointer to a list of related data elements. This allows a single list of related data elements to be used by all the data elements in one grouping.

Metadata item 422 contains one or more pointers to allow access to related data units. These may be, for example, data unit virtual addresses or inputs to an algorithm to calculate such addresses. Related data units may be, for example, previous or next data units in some virtual address sequence, or data units involved in a point-in-time copy operation, etc.

These pointers to related data elements (metadata items 418 and 420) and to related data units (metadata items 422) along with other metadata items such as the rules (items 426, 428, 430, etc.) allow improved recovery of virtual mapping systems. Pointers to related data elements may allow fast searches during map recovery by following the pointers of a specific type, such as the pointers to previous and companion data elements in a log structured file. Another example would be to use the metadata items 422 to search for the data elements associated with a particular data unit.

Metadata item 424 contains one or more timestamps indicating the time or relative sequence number of some event or events associated with this data element. This may include, for example, the time of the last change to the data, the time of the last update to this metadata, the time this data element was last moved, etc. The timestamp(s) in metadata item 424 may be used to enable recovery of mapping structures by, for example, distinguishing which of multiple data elements is the most current version, or which of multiple data elements contains the version of the data closest to the desired recovery checkpoint, etc.

Metadata item 426 contains rules for processing this data element and possibly related data elements. These rules may include, for example, an indication of the specific data format or encoding of this data element, or an algorithm for interpreting the data element format, or the PAID level of an associated redundancy group, thus indicating how the data elements in the redundancy group should be processed.

Metadata 428 contains pointers to rules for processing data elements, so that a single set of rules may be pointed to by and used for multiple data elements.

Metadata item 430 contains rules for the order in which data elements should be processed. This may include, for example, rules to indicate that the data elements of a certain set must be processed in timestamp order, oldest first, or that the data elements in a redundancy group must all be processed before the data elements in the next redundancy group or that the data elements that are pointed to as "previous" in a logical sequence should be processed first.

Metadata item 432 contains data unit attributes for the data unit or units associated with this data element. The may, include for example:
Performance criteria (item 434):
a) sustainable data transfer rate
b) sustainable SIO/sec
c) parallel SIO
Availability criteria (item 436):
a) time to first accessibility of data
b) time to hold off new users for consistency checks
Reliability criteria (item 438):
a) allowed probability of data block loss
b) allowed probability of data file loss
Capacity Management criteria (item 440):
a) maximum size of data unit In order to facilitate the processing of the data elements, the metadata structure 400 may also include pointers to executable functions for interpreting and executing management rules (item 442). The data elements can then have specific associated specialized functions, and processing of the data elements can proceed quickly without having to determine by logic which such functions are needed to process each data element.

The metadata structure may also contain boundary information for this data element (item 444) or for related data units (item 446). This boundary information may include, for example, the current size, or the current address range covered by the data element or data unit, and/or the maximum size allowed for this data element and/or data unit, and/or the range of allowed locations to store this data element, etc.

The access history for this data element and/or related data elements or data units may also be included, as in items 448 and 450. This may include information such as, for example, the count of accesses or frequency of accesses to this or related data elements or data units, and/or an indicator of the priority of the accesses, etc. This access history (448 and/or 450) may then be used to prioritize and order recovery processing of the data elements.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method far managing data comprising:
    providing a data element that includes metadata within said data element;
    storing data management information in the metadata, said data management information for managing said data element;
    storing, within said data element, one or more anchor points to begin selected analysis processes; and
    storing data management rules and processing rules in the metadata; and
    wherein the management information comprises one of a pointer to a sequencing rule, a pointer to a management rule, a pointer to an anchor point for beginning a selected analysis process, or a pointer to a processing rule.

2. The method of claim 1, wherein the management information comprises a time stamp.

3. The method of claim 1, wherein the management rule comprises one of performance criteria, reliability criteria, availability criteria, and capacity criteria.

4. The method of claim 1, wherein the management information comprises a sequencing rule.

5. The method of claim 4, wherein the sequencing rule comprises one of a logical rule, a time rule, and a structure rule.

6. The method of claim 1, wherein the management information comprises a management function far accomplishing management rules.

7. The method of claim 1, wherein the metadata is physically stored with the data.

8. The method of claim 1, wherein a pointer is stored with the data that allows one to locate the metadata.

9. The method of claim 1, wherein anchor points are pointers to the current location of the metadata for selected data elements.

10. The method of claim 1, wherein anchor points are copies of the metadata for selected data elements.

11. The method of claim 1, wherein processing rules define the order of selecting data elements for processing.

12. The method of 1, wherein processing rules define controls for processing management information for each data element.

13. The method of claim 12, wherein the processing controls include sequential processing in priority order.

14. The method of claim 12, wherein the processing controls include indexed processing following specific tree structures first.

15. The method of claim 12, wherein the processing controls include parallel processing.

16. The method of claim 15, wherein parallel processing includes a separate instance of processing for each data element found processed simultaneously.

17. The method of claim 15, wherein parallel processing includes a separate instance of processing for each data element found processed concurrently.

18. The method of claim 1, wherein management information comprises a pointer to the location where rules are stored.

19. A self-defining data element for enhanced data management and recovery, comprising:
    a data portion; and
    a metadata portion,
    wherein the metadata includes management information including management rules and processing rules and one or more anchor points to begin selected analysis processes; and
    wherein the management information comprises one of a pointer to a sequencing rule, a pointer to a management rule, a pointer to an anchor point for beginning a selected analysis process, or a pointer to a processing rule.

20. The self defining data element of claim 19, wherein the management information comprises a time stamp.

21. The self-defining data element of claim 19, wherein the management rule comprises one of performance criteria, reliability criteria, availability criteria, and capacity criteria.

22. The self-defining data element of claim 19, wherein the management information comprises a pointer to a management rule.

23. The self-defining data clement of claim 19, wherein the management information comprises a sequencing rule.

24. The self-defining data element of claim 23, wherein the sequencing rule comprises one of a logical rule, a time rule, and a structure rule.

25. The self-defining data element of claim 19, wherein the management information comprises a pointer to a sequencing rule.

26. The self-defining data element of claim 19, wherein the management information comprises a management function for accomplishing management rules.

* * * * *